United States Patent
Son et al.

(10) Patent No.: US 12,330,936 B2
(45) Date of Patent: Jun. 17, 2025

(54) METHOD FOR PREPARING CERAMIC SOLID ELECTROLYTE FOR LITHIUM SECONDARY BATTERY

(71) Applicant: SEVEN KING ENERGY CO., LTD., Seongnam-si (KR)

(72) Inventors: Jung Woo Son, Cheongju-si (KR); Ji Won Son, Changwon-si (KR); Jae Kwang Kim, Changwon-si (KR)

(73) Assignee: SEVEN KING ENERGY CO., LTD., Seongnam-si (KR)

( * ) Notice: Subject to any disclaimer, the term of this patent is extended or adjusted under 35 U.S.C. 154(b) by 1101 days.

(21) Appl. No.: 17/045,487

(22) PCT Filed: Mar. 27, 2019

(86) PCT No.: PCT/KR2019/003528
§ 371 (c)(1),
(2) Date: Oct. 5, 2020

(87) PCT Pub. No.: WO2019/194454
PCT Pub. Date: Oct. 10, 2019

(65) Prior Publication Data
US 2021/0155480 A1    May 27, 2021

(30) Foreign Application Priority Data
Apr. 5, 2018    (KR) .......... 10-2018-0039464

(51) Int. Cl.
*H01M 10/52*    (2006.01)
*C01B 25/45*    (2006.01)
(Continued)

(52) U.S. Cl.
CPC .......... *C01B 25/45* (2013.01); *C01P 2002/72* (2013.01); *C01P 2004/03* (2013.01);
(Continued)

(58) Field of Classification Search
CPC .. C01B 25/45; C01P 2002/72; C01P 2004/03; C01P 2006/40; H01M 10/0525;
(Continued)

(56) References Cited

U.S. PATENT DOCUMENTS 8,304,115 B1 * 11/2012 Petkov .............. H01M 10/0562
429/304
2002/0113344 A1 * 8/2002 Kitagawa .............. C04B 35/113
264/618

(Continued)

FOREIGN PATENT DOCUMENTS

CN    104466238 A    3/2015
CN    105406118 A    3/2016
(Continued)

OTHER PUBLICATIONS

Zhao et al.; Solid LATP/LAGP double-layer solid electrolyte prepared via simple dry-pressing method for solid state lithium ion batteries; RCS Advances, 2016, 6 92579-92585. (Year: 2016).*
(Continued)

*Primary Examiner* — Christian Roldan
(74) *Attorney, Agent, or Firm* — Insight Law Group, PLLC; Seung Lee (57) ABSTRACT

The present invention relates to a method for preparing a ceramic solid electrolyte having a even particle distribution, excellent crystallinity, and high ionic conductivity. Step 1 for preparing the ceramic solid electrolyte particles may be a step for adding and mixing raw materials to distilled water to prepare a solid electrolyte precursor. Step 2 may be a step for mixing the solid electrolyte precursor with a ball-mill. Step 3 may be a step for drying first by rotary concentrating or spraying. Step 4 may be a step for drying second in a dryer at 80° C. for at least 24 hours to completely remove the distilled water solvent. Step 5 may be a step for calcining
(Continued)

first ceramic particles in a heat treatment device and firing second the ceramic particles.

9 Claims, 10 Drawing Sheets

(51) Int. Cl.
*H01M 10/0525* (2010.01)
*H01M 10/0562* (2010.01)

(52) U.S. Cl.
CPC ..... *C01P 2006/40* (2013.01); *H01M 10/0525* (2013.01); *H01M 10/0562* (2013.01)

(58) Field of Classification Search
CPC ........... H01M 10/0562; H01M 10/052; H01M 2300/0071; H01M 50/434; H01M 4/664; H01M 4/8621; Y02E 60/10
See application file for complete search history.

(56) References Cited

U.S. PATENT DOCUMENTS

| | | | |
|---|---|---|---|
| 2005/0260410 A1* | 11/2005 | Fujikawa | C01G 23/003 501/137 |
| 2016/0293947 A1 | 10/2016 | Tamura et al. | |
| 2016/0293988 A1 | 10/2016 | Sakamoto et al. | |

FOREIGN PATENT DOCUMENTS

| | | |
|---|---|---|
| CN | 105609881 A | 5/2016 |
| CN | 106232526 A | 12/2016 |
| JP | 07-109175 A | 4/1995 |
| JP | 2008-110899 A | 5/2008 |
| JP | 2010-517738 A | 5/2010 |
| JP | 2013-191558 A | 9/2013 |
| JP | 2015-202998 A | 11/2015 |
| JP | 2016-509331 A | 3/2016 |
| JP | 2016-519395 A | 6/2016 |
| JP | 2016-207354 A | 12/2016 |
| JP | 2017-132682 A | 8/2017 |
| KR | 10-2012-0039447 A | 4/2012 |
| KR | 10-1383356 B1 | 4/2014 |
| KR | 10-2016-0135367 A | 11/2016 |
| WO | 2004/106232 A | 12/2004 |
| WO | WO2013156116 A1 * | 10/2013 |
| WO | 2015/064351 A | 5/2015 |

OTHER PUBLICATIONS

International Search Report for PCT/KR2019/003528, mailed Oct. 30, 2019, and its English translation.
Zhao, Erqing et al., "Stable LATP/LAGP double-layer solid electrolyte prepared via a simple dry-pressing method for solid state lithium ion batteries", RSC Advances, 2016, vol. 6, pp. 92579-92585.
Non-final Office Action mailed on Jun. 4, 2019 from the Korean Patent Office for Korean Application No. 10-2018-0039464.
Erqing Zhao, et al., "Stable LATP/LAGP doubleOlayer solid electrolyte prepared via a simple dry-pressing method for solid state lithium ion batteries," RSC Adv. 2016., vo. 6, pp. 92579-92585 (Sep. 21, 2016).
Extended European Search Report mailed on Sep. 27, 2021 from the European Patent Office for European Application No. 19781886.7.
Non-final Office Action mailed on Jun. 29, 2021 from the Japanese Patent Office for Japanese Application No. 2020-554217.
Non-final Office Action mailed on Apr. 26, 2021 from the Chinese Patent Office for Chinese Application No. 2021042201974470.

* cited by examiner

METHOD FOR PREPARING CERAMIC SOLID ELECTROLYTE FOR LITHIUM SECONDARY BATTERY

CROSS-REFERENCE TO RELATED APPLICATIONS

This application is a 371 national phase entry of International Application No. PCT/KR2019/003528, filed on Mar. 27, 2019, which claims the benefit of and priority to Korean Patent Application No. 10-2018-0039464, filed on Apr. 5, 2018, the disclosures of which are herein incorporated by reference in their entirety.

TECHNICAL FIELD

The present invention relates to a method for preparing a ceramic solid electrolyte used for a solid lithium secondary battery. The present invention relates to a method for preparing a ceramic solid electrolyte having even particle distribution, excellent crystallinity, and high ionic conductivity. The ceramic solid electrolyte of the present invention may comprise oxide-based, phosphate-based, and sulfide-based electrolytes.

BACKGROUND ART

Currently, the lithium secondary battery market has been extended not only to small-sized IT devices, but also to medium/large-sized markets such as electric vehicles and ESS systems. Such a lithium secondary battery is required to have high instantaneous output, excellent reversibility during charging and discharging, high energy density, and excellent reproducibility and stability. Flexibility in shape and processing also plays an important role in order to cope with the trend to be more compact and thinner. In particular, as the lithium secondary battery market becomes gradually medium/large-sized, there is a growing need to manufacture a secondary battery by packaging or modularizing plural cells rather than to manufacture a secondary battery with one cell.

However, using an explosive liquid electrolyte to package and enlarge it is the same as creating a gunpowder where you never know when it will explode. In addition, lithium secondary batteries using liquid electrolytes have the risk of explosion when the temperature rises, and thus requires expensive safety devices such as a vent cap or a positive temperature coefficient (PTC) device. The use of these safety devices is a cause of lowering the energy density of the lithium secondary battery and increasing the manufacturing cost of the battery. Therefore, the use of expensive safety devices has a disadvantage in terms of the energy density and the manufacturing cost of the secondary batteries, in both small-capacity batteries used in portable electronic devices and large-capacity batteries such as power sources for electric vehicles. In particular, for the commercialization of large-capacity batteries such as electric vehicles batteries, it is required to develop a solid-state batteries that can secure the stability of secondary batteries without using expensive safety devices as they have excellent stability.

Lithium ion conductive ceramics, which may be called a starting point of developing a solid electrolyte, may be largely divided into sulfide-based and oxide-based ceramics. The sulfide-based solid electrolyte is relatively easy to synthesize and has ductility compared to the oxide-based solid electrolyte and thus, does not require high heat treatment during processing. The sulfide-based solid electrolyte also exhibits high conductivity. For example, thio-LISICON ($Li_{3.25}Ge_{0.25}P_{0.75}S_4$) shows the conductivity of 2.2 mS/cm, and LGPS($Li_{10}GeP_2S_{12}$) shows the conductivity of 12 mS/cm. However, the sulfide-based solid electrolyte has a fatal disadvantage of having a severe odor and being unstable in air and water, so the need for a stable oxide-based solid electrolyte is emerging. Representative oxide-based solid electrolytes include LATP($Li_{1+x}Al_xTi_{2-x}(PO_4)_3$) ($0<x<2$), LAGP ($Li_{1+x}Al_xGe_{2-x}(PO_4)_3$) ($0<x<2$), $Li_7La_3Zr_2O_{12}$ (LLZO), etc. Among them, the LATP and the LAGP are good for commercialization because they have excellent ionic conductivity and are stable in the atmosphere. Most of these oxide-based solid electrolytes are prepared by a solid phase method, so the particles are uneven and the crystallinity varies greatly depending on the heat treatment temperature.

PRIOR ARTS

Patent Document (Patent Document 0001) Korean Patent Unexamined Publication No. 10-2012-0039447

DISCLOSURE

Technical Problem

In a conventional method for synthesizing a ceramic solid electrolyte, the ceramic solid electrolyte is prepared by mixing raw material particles by a solid phase method, mixing the mixture by ball-milling in a dry state, and then heating the mixture. The ceramic solid electrolyte prepared by this way has low ionic conductivity because it has uneven particle distribution and various shapes of particles. An object of the present invention is to prepare a ceramic solid electrolyte having even particle distribution, even particle shape, and excellent crystallinity by improving the conventional method for synthesizing the ceramic solid electrolyte.

Technical Solution

Conventional ceramic solid electrolytes have uneven particle distribution and particle shape, which makes dispersion uneven, lowers the ionic conductivity, and reduces the electrochemical properties of the battery when manufactured as an electrolyte. Accordingly, the present invention provides ceramic solid electrolyte particles having spherical shapes and even distribution by mixing raw materials using water as a solvent and applying a rotary concentration method or a spray method. When the ceramic particles prepared above are made into an electrolyte and applied to a battery, it is possible to exhibit excellent electrochemical properties.

Advantageous Effects

According to the present invention, it is possible to prepare a high-performance ceramic electrolyte having even particle shape and distribution.

BEST MODE FOR INVENTION

The specific content of the present invention will be described in more detail. However, this is to present an embodiment of the present invention as an example. The present invention is not limited by the following description. The present invention is only defined by the following claims to be described below.

In one embodiment of the present invention, the oxide-based conductive ceramic electrolyte may be prepared by mixing raw materials of the ceramic solid electrolyte in an equivalent ratio using distilled water as a solvent, mixing the mixture in a solution state for 24 hours by ball-milling, drying first by adding a rotary concentration method or a spray method, drying second at 80° C., heating first at 400° C. for 4 hours, and heating second at 1000° C. for 4 hours.

The solid electrolyte LATP may be represented by the following Chemical Formula 1.

$Li_{1+x}Al_xTi_{2-x}(PO_4)_3 (0<x<2)$ [Chemical Formula 1]

Among them, $Li_{1.3}Al_{0.3}Ti_{1.7}(PO_4)_3$ is preferable.

Step 1 for preparing the LATP ceramic solid electrolyte may be a step of preparing a solid electrolyte precursor by adding and mixing lithium chloride, aluminum nitrate, ammonium phosphate, and titanium butoxide in distilled water. The lithium chloride is LiCl, the aluminum nitrate is $Al(NO_3)_3·9H_2O$, the ammonium phosphate is $NH_4H_2PO_4$, and the titanium butoxide is $Ti(OC_4H_9)_4$.

Step 2 may be a step for mixing the solid electrolyte precursor with a ball-mill. The speed of the ball-mill may be 150 RPM to 400 RPM, preferably 200 to 300 RPM.

Step 3 may be a step for drying first by a rotary concentration method or a spray method. The temperature of the rotary concentration method may be 60° C. to 100° C., preferably 70° C. to 80° C. The temperature of the spray method may be 80° C. to 300° C., preferably 100° C. to 200° C.

Step 4 may be a step for drying second in a dryer at 80° C. for at least 24 hours to completely remove the distilled water solvent.

Step 5 may be a step for calcining first ceramic particles in a heat treatment device and firing second the ceramic particles. The first calcining temperature may be 300° C. to 500° C., preferably 350° C. to 450° C. The second firing temperature may be 900° C. to 1200° C., preferably 1000° C. to 1100° C. The calcining and firing time may be 2 to 10 hours, preferably 3 to 5 hours. The ceramic particles may be calcined at 400° C. for 4 hours and then fired at 1000° C. for 4 hours.

The heat treatment may be performed by starting from room temperature. The solid electrolyte ceramic particles may be made into a powder form with a mortar.

The solid electrolyte LAGP may be represented by the following Chemical Formula 2.

$Li_{1+x}Al_xGe_{2-x}(PO_4)_3 (0<x<2)$ [Chemical Formula 2]

Among them, $Li_{1.3}Al_{0.3}Ge_{1.7}(PO_4)_3$ is preferable.

Step 1 for preparing the LAGP ceramic solid electrolyte particles may be a step of preparing a solid electrolyte precursor by adding and mixing lithium chloride, aluminum nitrate, ammonium phosphate, and germanium oxide in distilled water. The lithium chloride is LiCl, the aluminum nitrate is $Al(NO_3)_3·9H_2O$, the ammonium phosphate is $NH_4H_2PO_4$, and the germanium oxide is $GeO_2$.

Step 2 may be a step for mixing the solid electrolyte precursor with a ball-mill. The speed of the ball-mill may be 150 RPM to 400 RPM, preferably 200 to 300 RPM.

Step 3 may be a step for drying first by a rotary concentration method or a spray method. The temperature of the rotary concentration method may be 60° C. to 100° C., preferably 70° C. to 80° C. The temperature of the spray method may be 80° C. to 300° C., preferably 100° C. to 200° C.

Step 4 may be a step for drying second in a dryer at 80° C. for at least 24 hours to completely remove the distilled water solvent.

Step 5 may be a step for calcining first ceramic particles in a heat treatment device and firing second the ceramic particles. The first calcining temperature may be 300° C. to 500° C., preferably 350° C. to 450° C. The second firing temperature may be 900° C. to 1200° C., preferably 1000° C. to 1100° C. The calcining and firing time may be 2 to 10 hours, preferably 3 to 5 hours. The ceramic particles may be calcined at 400° C. for 4 hours and then fired at 1000° C. for 4 hours.

Example 1

The synthesis of an LATP solid electrolyte was performed by calculating the chemical equivalent ratio of LiCl, $Al(NO_3)_3·9H_2O$, $NH_4H_2PO_4$, and $Ti(OC_4H_9)_4$, capable of forming $Li_{1.3}Al_{0.3}Ti_{1.7}(PO_4)_3$ (LiCl 1 mole molecular weight=42.39 g/mol, $Al(NO_3)_3·9H_2O$ 1 mole molecular weight=375.13 g/mol, $NH_4H_2PO_4$ 1 mole molecular weight=115.03 g/mol, $Ti(OC_4H_9)_4$ 1 mole molecular weight=340.32 g/mol), and then each 0.1 mol was added to 250 ml of distilled water. Thereafter, zirconia balls of 5 mm and 10 mm in diameter were prepared in a ratio of 2:1, and then added in a 500 ml container prepared so that a volume ratio of the mixed sample and the zirconia balls was 1:1. The rotary speed of the ball milling was 200 to 300 RPM, and the ball milling was performed for 24 hours. After ball milling, the zirconia balls were removed from the sample. Then, the sample was dried first by a rotary concentration method or a spray method, put in an evaporation dish and then sufficiently dried second at 80° C. for 24 hours. Then, the dried sample was pulverized in a mortar to form a powder form. Then, the sample was heat treated as follows. The temperature was raised from room temperature to 400° C. Then, the sample was heat treated for 4 hours to calcine the sample and cooled naturally until 100° C. or less. Thereafter, the sample was heat treated at 1000° C. for 4 hours to fire the sample and then pulverized to prepare a powdered LATP solid electrolyte.

Although the preferred Example of the present invention has been described as above, the present invention is not limited to the Example, and various modifications are possible by those skilled in the art within the scope of the technical idea of the present invention.

Figure 1:
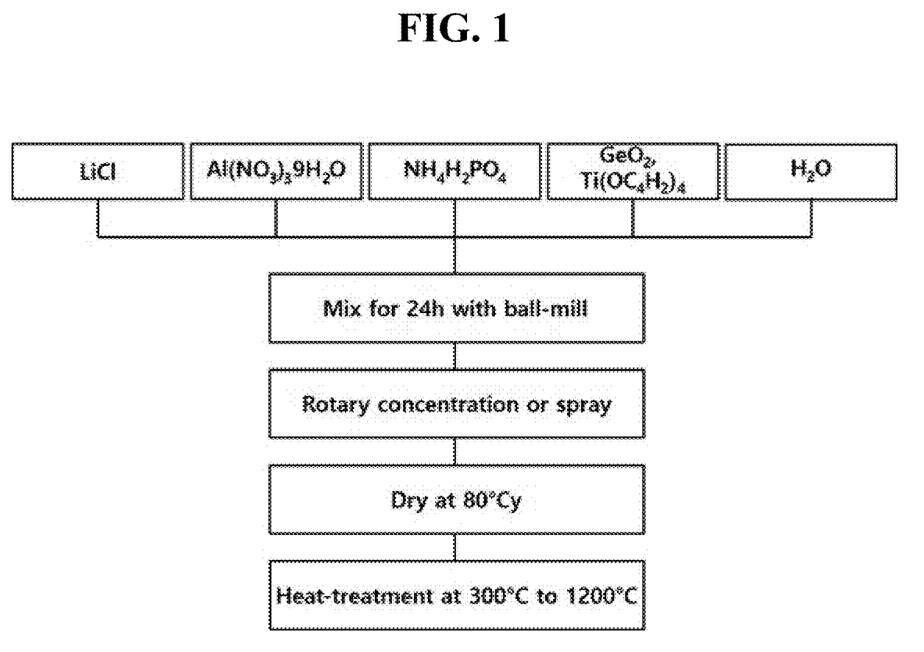
FIG. 1 is a schematic diagram of a process of preparing a ceramic electrolyte according to an embodiment of the present invention.
Figure 2:
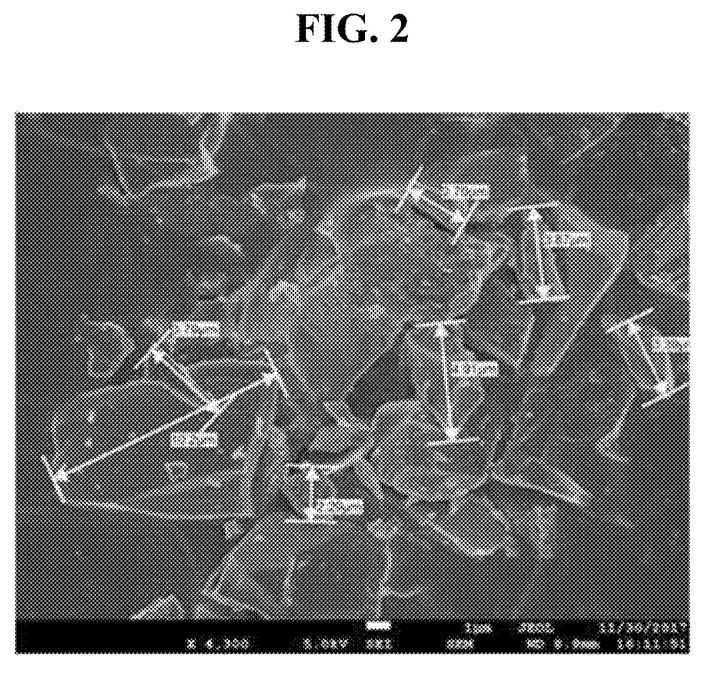
FIG. 2 is an SEM photograph showing the distribution and shape of LATP particle sample 1 according to a preparation process of Table 1.
Figure 3:
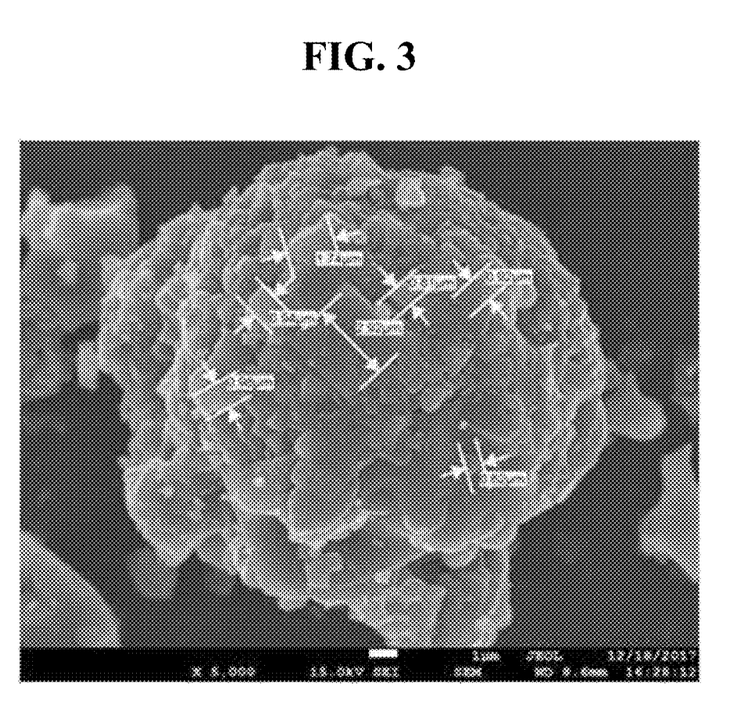
FIG. 3 is an SEM photograph showing the distribution and shape of LATP particle sample 2 according to a preparation process of Table 1.
Figure 4:
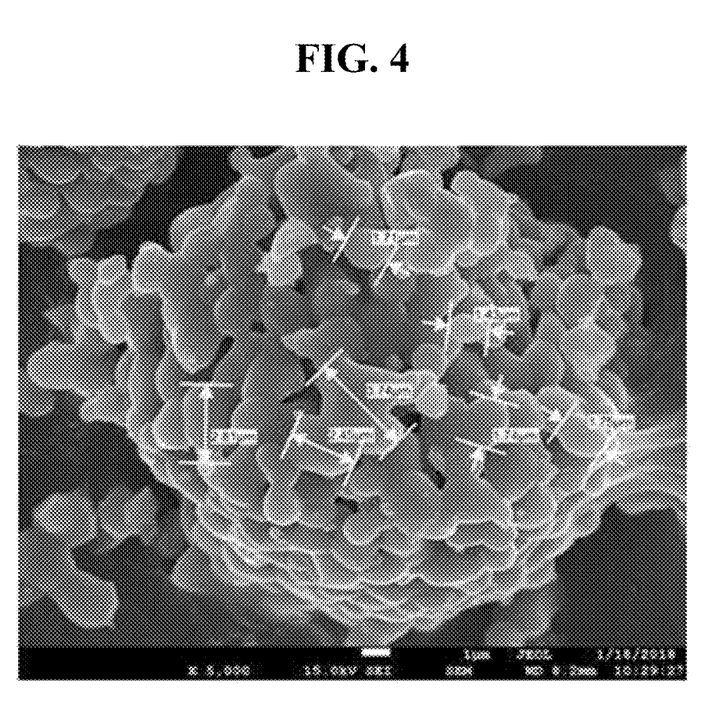
FIG. 4 is an SEM photograph showing the distribution and shape of LATP particle sample 3 according to a preparation process of Table 1.
Figure 5:
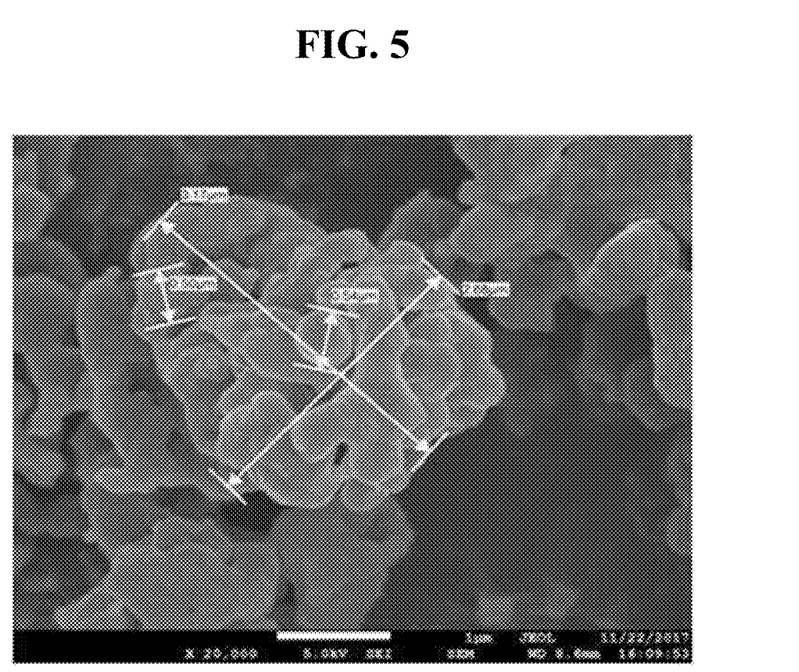
FIG. 5 is an SEM photograph showing the distribution and shape of LATP particle sample 4 according to a preparation process of Table 1.

A method of preparing the LATP solid electrolyte was illustrated in FIG. 1. As in the prior art, a sample obtained by ball-milling and mixing without using a distilled water solvent and then heat-treating is referred to as Sample 1, a sample obtained by ball-milling and mixing using a distilled water solvent, drying the solvent, and then heat-treating is referred to as Sample 2, a sample obtained by ball-milling and mixing using a distilled water solvent, drying first the solvent by a rotary concentration method, drying second the solvent in an oven, and then heat-treating is referred to as Sample 3, and a sample obtained by ball-milling and mixing using a distilled water solvent, drying first the solvent by spraying, drying second the solvent in an oven, and then heat-treating is referred to as Sample 4. Samples 1 to 4 are summarized in Table 1 below.

TABLE 1

| Synthesis condition | Using distilled water solvent | Ball-milling and mixing | Process added | Heat treatment |
|---|---|---|---|---|
| Sample 1 | x | 24 h | x | 400° C., 4 h<br>1000° C., 4 h |
| Sample 2 | o | 24 h | x | 400° C., 4 h<br>1000° C., 4 h |
| Sample 3 | o | 24 h | Rotary concentrating | 400° C., 4 h<br>1000° C., 4 h |
| Sample 4 | o | 24 h | Spraying | 400° C., 4 h<br>1000° C., 4 h |

FIGS. 2 to 5 are SEM photographs of LATP ceramic particles according to the above process. Sample 1 (FIG. 2) has an irregular particle shape and a wide particle distribution of 1 to 10 micrometers. Sample 2 (FIG. 3) contains some irregularly shaped particles, but is generally even, and the particle distribution is 0.6-3 micrometers. Sample 3 (FIG. 4) has a very even particle shape and has a particle distribution of 1 to 3 micrometers. Sample 4 (FIG. 5) has a very even particle shape and has a particle distribution of 0.6 to 3 micrometers.

Figure 6:
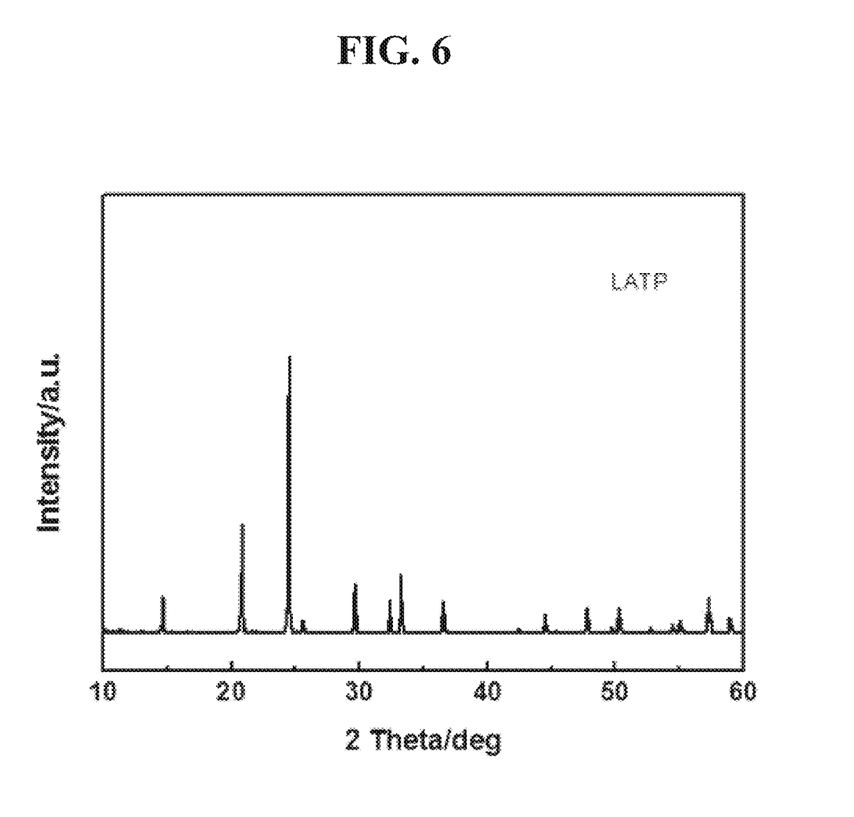
FIG. 6 is an XRD graph of $Li_{1.3}Al_{0.3}Ti_{1.7}(PO_4)_3$, which is a ceramic solid electrolyte prepared by adding a rotary concentration method.

The synthesized $Li_{1.3}Al_{0.3}Ti_{1.7}(PO_4)_3$ was analyzed at a scanning speed of 4°/min for an XRD analysis 2 theta section of 10° to 90°. The analyzed results were shown in FIG. 6. It can be seen that the LATP is synthesized in a NASICON structure.

The ionic conductivities of Samples 1 to 4 are shown in Table 2.

TABLE 2

| | Sample 1 | Sample 2 | Sample 3 | Sample 4 |
|---|---|---|---|---|
| Ionic conductivity (S/cm) | $2.2 \times 10^{-4}$ | $3.4 \times 10^{-4}$ | $7.2 \times 10^{-4}$ | $6.8 \times 10^{-4}$ |

As the particles are more even and the distribution is better, the ionic conductivity is increased.

Example 2

The synthesis of an LAGP solid electrolyte was performed by calculating the chemical equivalent ratio of LiCl, $Al(NO_3)_3 \cdot 9H_2O$, $NH_4H_2PO_4$, and $GeO_2$, capable of forming $Li_{1.3}Al_{0.3}Ge_{1.7}(PO_4)_3$ (LiCl 1 mole molecular weight=42.39 g/mol, $Al(NO_3)_3 \cdot 9H_2O$ 1 mole molecular weight=375.13 g/mol, $NH_4H_2PO_4$ 1 mole molecular weight=115.03 g/mol, $GeO_2$ 1 mole molecular weight=104.63 g/mol), and then each 0.1 mol was added to 250 ml of distilled water.

Thereafter, zirconia balls of 5 mm and 10 mm in diameter were prepared in a ratio of 2:1, and then added in a 500 ml container prepared so that a volume ratio of the mixed sample and the zirconia balls was 1:1. The rotary speed of the ball milling was 200 to 300 RPM, and the ball milling was performed for 24 hours. After ball milling, the zirconia balls were removed from the sample. Then, the sample was dried first by a rotary concentration method or a spray method, put in an evaporation dish and then sufficiently dried second at 80° C. for 24 hours. Then, the dried sample was pulverized in a mortar to form a powder form. Then, the sample was heat treated as follows. The temperature was raised from room temperature to 400° C. Then, the sample was heat treated for 4 hours to calcine the sample and cooled naturally until 100° C. or less. Thereafter, the sample heat treated at 1000° C. for 4 hours to fire the sample and then pulverized to prepare a powdered LATP solid electrolyte.

Although the preferred Example of the present invention has been described as above, the present invention is not limited to the Example, and various modifications are possible by those skilled in the art within the scope of the technical idea of the present invention.

Figure 7:
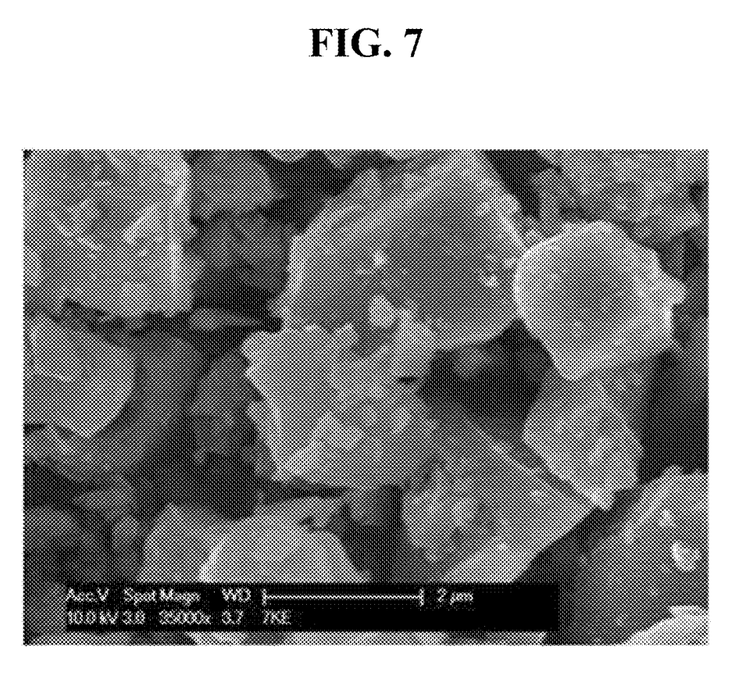
FIG. 7 is a SEM photograph of particles of LAGP synthesized by a method of Sample 1.
Figure 8:
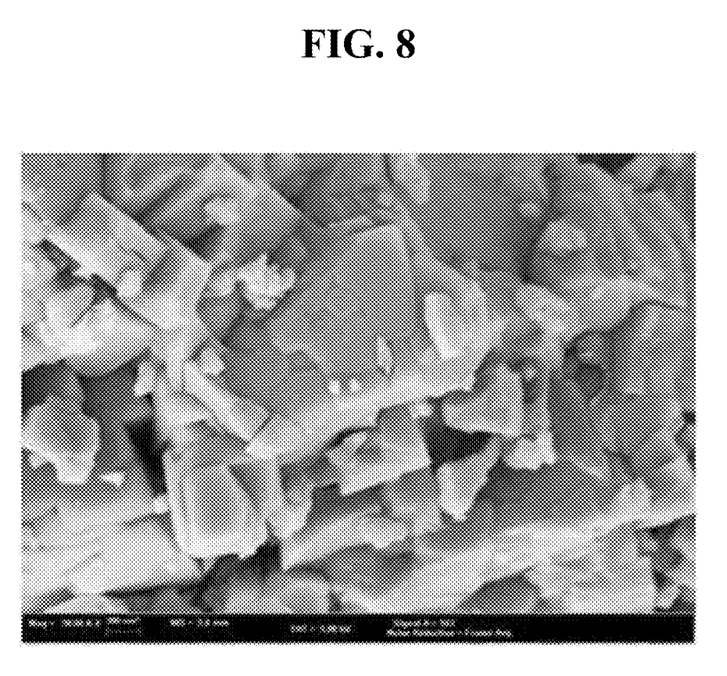
FIG. 8 is a SEM photograph of particles of LAGP synthesized by a method of Sample 2.
Figure 9:
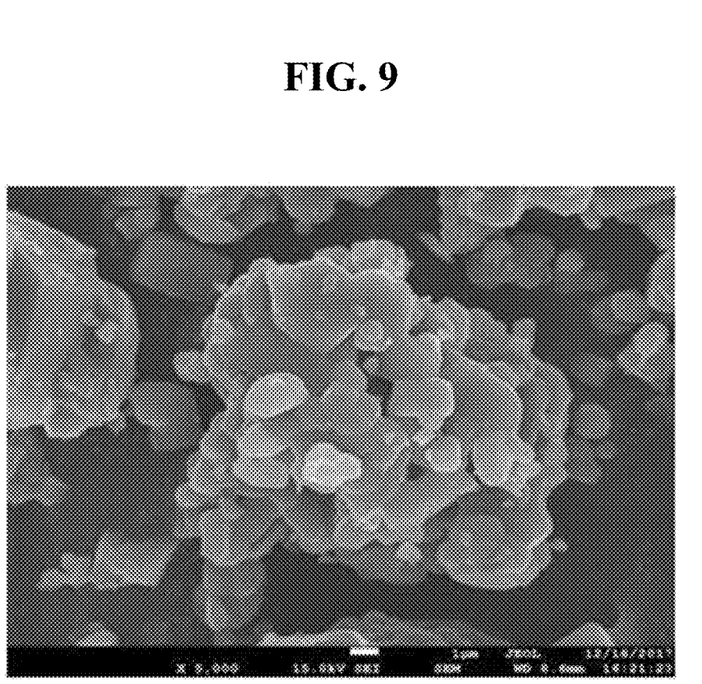
FIG. 9 is a SEM photograph of particles of LAGP synthesized by a method of Sample 3.

FIGS. 7 to 9 are SEM photographs of particles of LAGP synthesized by methods of Samples 1 to 3. The particles synthesized through first solvent drying by adding rotary concentration method (Sample 3) shows the best particle characteristic.

Figure 10:
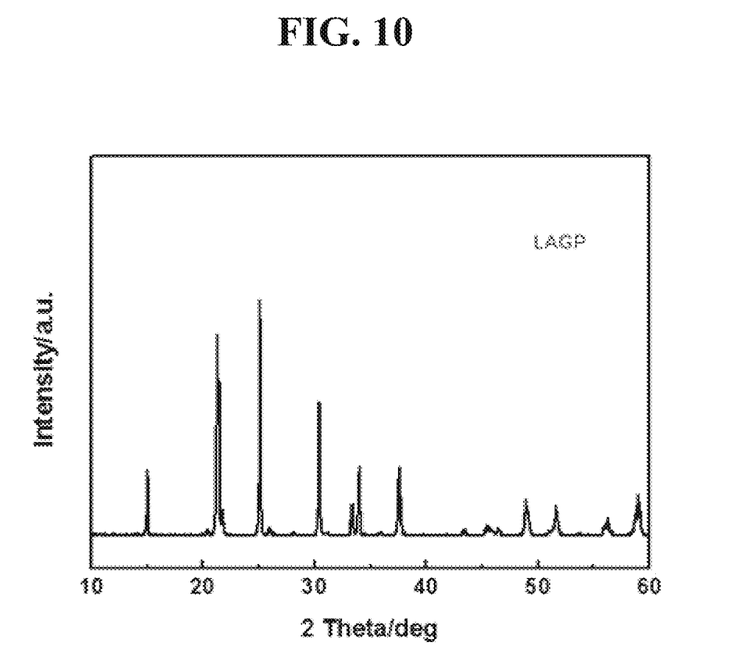
FIG. 10 is an XRD graph of $Li_{1.3}Al_{0.3}Ge_{1.7}(PO_4)_3$, which is a ceramic solid electrolyte prepared by adding a rotary concentration method.

The synthesized $Li_{1.3}Al_{0.3}Ge_{1.7}(PO_4)_3$ was analyzed at a scanning speed of 4°/min for an XRD analysis 2 theta section of 10° to 90°. The analyzed results were shown in FIG. 10. It can be seen that the LAGP is synthesized in a NASICON structure.

The invention claimed is:

1. A method for preparing a ceramic solid electrolyte comprising:
    a step of making a precursor of ceramic solid electrolyte by mixing raw materials of the ceramic solid electrolyte with distilled water;
    a step of mixing the precursor of the ceramic solid electrolyte in a solution state by ball-milling;
    a step of drying the distilled water to obtain a dried product;
    a step of first heat treatment of the dried product at 300° C. to 500° C. for 2 hours to 10 hours to obtain a first heat treatment product; and
    a step of second heat treatment of the first heat treatment product at 900° C. to 1200° C. for 2 hours to 10 hours.

2. A method for preparing a ceramic solid electrolyte comprising:
    a step of making a precursor of ceramic solid electrolyte by mixing raw materials of the ceramic solid electrolyte with distilled water;
    a step of mixing the precursor of the ceramic solid electrolyte in a solution state by ball-milling;
    a step of first drying of the distilled water by rotary concentrating process to obtain a first dried product;

a step of second drying of the distilled water in a dryer to obtain a second dried product;

a step of first heat treatment of the second dried product at 300° C. to 500° C. for 2 hours to 10 hours to obtain a first heat treatment product; and a step of second heat treatment of the first heat treatment product at 900° C. to 1200° C. for 2 hours to 10 hours.

3. A method for preparing a ceramic solid electrolyte comprising:

a step of making a precursor of ceramic solid electrolyte by mixing raw materials of the ceramic solid electrolyte with distilled water;

a step of mixing the precursor of the ceramic solid electrolyte in a solution state by ball-milling;

a step of first drying of the distilled water by spray method to obtain a first dried product;

a step of second drying of the distilled water in a dryer to obtain a second dried product;

a step of first heat treatment of the second dried product at 300° C. to 500° C. for 2 hours to 10 hours to obtain a first heat treatment product; and a step of second heat treatment of the first heat treatment product at 900° C. to 1,200° C. for 2 hours to 10 hours.

4. The method for preparing the ceramic solid electrolyte according to claim 1, wherein the ceramic solid electrolyte is an oxide-based ceramic solid electrolyte.

5. The method for preparing the ceramic solid electrolyte according to claim 2, wherein the temperature of the rotary concentrating process is 60° C. to 100° C.

6. The method for preparing the ceramic solid electrolyte according to claim 3, wherein the temperature of the spray method process is 80° C. to 300° C.

7. The method for preparing the ceramic solid electrolyte according to claim 1, wherein the temperature of the first heat treatment is 350° C. to 450° C.

8. The method for preparing the ceramic solid electrolyte according to claim 1, wherein the temperature of the second heat treatment is 1000° C. to 1100° C.

9. The method for preparing the ceramic solid electrolyte according to claim 1, wherein the first heat treatment time is 3 hours to 5 hours and the second heat treatment time is 3 hours to 5 hours.

* * * * *